United States Patent [19]

Christensen

[11] Patent Number: 5,368,358

[45] Date of Patent: Nov. 29, 1994

[54] COMPOSITE SPRING SUPPORT FOR BICYCLE SEATS

[76] Inventor: Roland J. Christensen, 192 E. 1st, North, Fayette, Utah 84630

[21] Appl. No.: 65,879

[22] Filed: May 21, 1993

[51] Int. Cl.⁵ .............................................. B62J 1/02
[52] U.S. Cl. ................................. 297/215; 297/215.13; 248/622; 248/626; 267/31; 267/158
[58] Field of Search .......... 297/215, 196, 198, 215.13, 297/215.14; 248/622, 626, 562; 280/220, 283, 287; 267/158, 149, 44, 31

[56] References Cited

U.S. PATENT DOCUMENTS

| | | | |
|---|---|---|---|
| 470,707 | 3/1892 | Saunders . | |
| 477,123 | 6/1892 | Johnson | 297/215 X |
| 584,944 | 6/1897 | Little | 280/283 |
| 597,674 | 1/1898 | Hardy . | |
| 606,302 | 6/1898 | Royston | 297/215 X |
| 612,215 | 10/1898 | Ross . | |
| 646,919 | 4/1900 | Ross . | |
| 3,229,954 | 1/1966 | Hendricks | 248/600 |
| 4,580,835 | 4/1986 | Angell et al. | 297/215.13 |

FOREIGN PATENT DOCUMENTS

| | | | |
|---|---|---|---|
| 429704 | 5/1925 | Germany | 248/388 |
| 474476 | 6/1927 | Germany . | |
| 276938 | 9/1927 | United Kingdom | 297/215 |

Primary Examiner—Laurie K. Cranmer
Attorney, Agent, or Firm—Thorpe, North & Western

[57] ABSTRACT

A bicycle seat support comprising a bicycle seat providing a seat surface to support a rider during use. The bicycle seat is coupled at a bottom side to a telescoping shaft for insertion within a larger, hollow shaft forming a part of a bicycle frame. A nonlinear spring member composed of a composite material and including two ends and an intermediate section provides resilient support to the bicycle seat. Attachment clamps are coupled at each of the ends of the nonlinear spring member for enabling attachment of the nonlinear spring member between the bicycle seat and the larger, hollow shaft.

22 Claims, 3 Drawing Sheets

COMPOSITE SPRING SUPPORT FOR BICYCLE SEATS

BACKGROUND OF THE INVENTION

1. Field of Invention

This invention relates to a bicycle seat support which provides a comfortable surface for the rider during use. Specifically, the invention provides a spring cushioned bicycle seat which is supported by a nonlinear, composite spring that provides a resilient force against the seat.

2. Prior Art

There exists within the bicycle industry a variety of techniques of coupling a bicycle seat to the frame of the bicycle. The most common of these techniques is to directly couple the bicycle seat to a shaft extending from the frame by using a C-clamp that is part of the bicycle seat and can be tightened around the extending shaft. The shaft, in turn, is then coupled directly to the frame of the bicycle. This technique provides the rider with a sturdy, non-tilting surface to sit on during use. A problem with this technique is that the seat's movement is dependent with the frame of the bicycle. Therefore, when the bicycle encounters a sudden, jolting movement, the impact is transferred directly into the seat and to the rider.

To enhance comfort, the prior art teaches the use of a spring biased bicycle seat in various configurations. The principle function of such spring mechanisms is to allow the bicycle seat to move independently in relation to the bicycle frame. U.S. Pat. Nos. 612,215, 646,919, 597,674 disclose a multiple spring biased bicycle seat. The seats rest either directly or indirectly on a convoluted spring. This convoluted spring is intended to support the bicycle seat and allow it to move independently of the frame of the bicycle.

A problem with this design is that the convoluted spring does not provide a stable surface on which the bicycle seat can be coupled. In other words, because the bicycle seat is positioned above a convoluted spring, the bicycle seat can tilt either side-to-side or back-to-front. Other prior art spring configurations have included multiple spring biased elements which couple to the bicycle seat and allow the seat to move independently of the frame. This, however, still results in an inconsistent side-to side motion of the rider which compromises the sense of full control of the frame. Many riders have chosen to retain the noncushioned seat which provides better control of the bicycle frame, rather than adopt the convoluted spring which has a tilting response.

There also exists variations of the above described multiple spring biased bicycle seat. For example, U.S. Pat. No. 474,476 discloses a multiple spring biased bicycle seat support wherein the seat is positioned on a roller-track system. The seat is supported by a roller-track that allows the seat to move independent of the frame, but due to the complexity of the system, break-down and costly repair are inevitable.

There exists within the bicycle industry a need of a bicycle seat that is simple, reliable and safe. The bicycle seat should be able to move independent of the frame of the bicycle with the spring member absorbing outside forces placed on the bicycle frame. The number of springs should be minimized, thereby allowing a consistent, uniform movement. The seat must also be relatively simple, yet provide the rider lateral stability during use.

OBJECTS AND SUMMARY OF THE INVENTION

It is an object of the present invention, therefore, to provide a bicycle seat support that provides a sturdy surface, supported by a single spring member which provides stiffness that give the rider a full sense of control, as well as the comfort of a cushioned ride.

It is a further object to provide a spring biased bicycle seat wherein the spring member rigid laterally, but places a resilient force against the seat in a vertical orientation, thereby absorbing any outside force placed on the bicycle seat.

It is a further object of the invention to provide a reliable seat support system that is simple in nature, thereby decreasing the risk of break-down and lowering the cost of repair.

These and other objects of the present invention are realized in a singular spring biased bicycle seat device to be used in cooperation with a bicycle. This bicycle seat provides a sturdy sitting surface for the rider during use by directly coupling a bicycle seat to a telescoping shaft. Because the bicycle seat is coupled directly to the telescoping shaft, the seat will not tilt in any direction. The telescoping shaft is configured to allow insertion within a larger, hollow shaft that is part of the frame of a bicycle. A composite, curved or nonlinear spring is coupled at one end to the bicycle seat and at the other end to the large hollow shaft. This curved spring provides a resilient force on the bicycle seat, thereby allowing the telescoping shaft that is inserted into the larger, hollow shaft to oscillate when a force is applied on the bicycle. Due to the inherent strength of the composite spring, the bicycle seat is supported independently by one curved spring, thereby providing a consistent, uniform movement of the bicycle seat which is stiff with respect to the frame in all lateral directions, but resilient vertically. This movement, therefore, provides the rider with a comfortable, smooth bicycle ride while retaining complete control.

Other objects and features of the present invention will be apparent to those skilled in the art, based on the following detailed description, taken in combination with the accompanying drawings.

DESCRIPTION OF THE INVENTION

Figure 1:
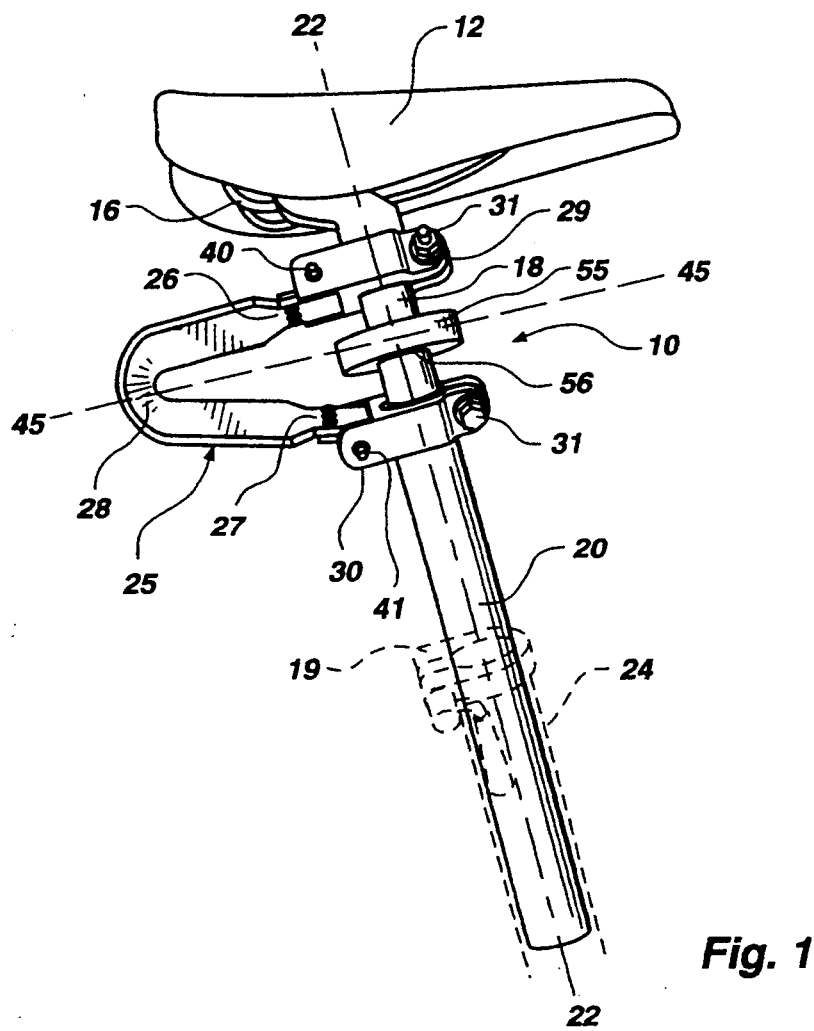
FIG. 1 shows a side view of a preferred embodiment of the present invention.

Referring now to the drawings:

FIG. 1 illustrates a singular spring biased, bicycle seat device 10 which provides a sitting surface or bicycle seat 12 on which a rider sits during use. The bicycle seat is securely coupled to a telescoping shaft 18 by attachment means 16. Therefore, the bicycle seat 12 cannot move independently of the telescoping shaft 15. Because the bicycle seat 12 is directly connected to the telescoping shaft 18, the telescoping shaft provides the seat lateral stability. In other words, because the seat is directly connected to a sturdy vertical member, the seat cannot tilt. If the bicycle seat 12, for example, was connected to a flimsy member (i.e. convoluted spring), the bicycle seat could tilt either side-to-side or front-to-back during use, thereby diminishing the rider's sense of control and oneness with the bicycle.

The telescoping shaft 18 is slidably constrained within a larger, hollow shaft 20. One embodiment of the present invention would allow the larger, hollow shaft 20 to be part of the frame 23 of the bicycle, whereas the preferred embodiment configures the hollow shaft 20 to fit within a separate hollow shaft 24 of the frame. In either case, the hollow shaft 20 or 24 will be rigidly secured with respect to the frame so that the telescoping shaft reciprocates with one or both of the hollow shafts. The configuration illustrated in FIG. 1 has the advantage of allowing for height adjustment of the seat such as is provided by the locking device 19 which forms a collar to retain the hollow shaft 20 in rigid attachment with respect to the frame.

Because the telescoping shaft 18 is fitted within the hollow shaft 20, the only allowable movement of telescoping shaft is along a shared axis 22 of both the telescoping shaft 18 and the hollow shaft 20. Because the telescoping shaft 20 is allowed movement in only one specific direction, the movement of the bicycle seat 20 is also limited along the share axis 22.

A curved composite spring 25 with two ends 26 and 27 and an intermediate section 28 is used to provide support to the rider during use. The first end 26 of the composite spring is configured with attachment means 29 for attachment to the telescoping shaft 18, which is affixed to bicycle seat 12 by means of the brace 16. Accordingly, the seat 12, brace 16, telescoping shaft 18 and attachment means form a single unit which is rigidly locked together. This unit can only move in a reciprocating manner with the telescoping shaft as it travels within the hollow shaft 20.

The second end 27 of the curved spring is configured with a similar attachment means 30 for attachment to the hollow shaft 20. Both attachment means 29 and 30 comprise vice grips which respectively grip the telescoping shaft 18 and the hollow shaft 20. These may be made of metal or plastic and include a locking screw or bolt 31 which enables the shafts to be frictionally secured.

The composite spring 25 is removably positioned between the bicycle seat 12 and the hollow shaft 20 by coupling the respective attachment means 29 and 30 in place using removable hinge pins 40 and 41. By pulling these pins from their slots, the spring 25 can be pulled free and the bicycle seat and attached telescoping shaft 18 can be removed and stored. When in place, the hinge pins 40 and 41 permit the spring ends 26 and 27 to rotate about each axis when the spring partially collapses together. This avoids putting undue stress on the ends 26 and 27 of the spring.

The curved, composite spring 25 prevents contact between the bicycle seat 12 and the hollow shaft 20 by placing a resilient force on the bicycle seat 12. The curved spring 25 also allows the telescoping shaft 18 movement within the hollow shaft 20. Due to the fact that the telescoping shaft 18 moves only on a shared axis 22 with the hollow shaft 20, the movement of the telescoping shaft 18 is uniform and smooth. The movement of the telescoping shaft within the hollow shaft has no lateral or rotational movement, only a longitudinal movement along the shared axis 22 of the two shafts. This uniform, smooth movement is accomplished because of the snug fit of the telescoping shaft 18 into the hollow shaft 20 and by the singular spring member 25.

Due to the inherent strength of the composite spring member 25, the spring independently supports the rider by placing a resilient force on the bicycle seat. The composite spring has the unique capability of having its strength and resilience programmed in different orientations rather than in an isotropic manner. By laying the matt, roving and longitudinal fibers in specific orientations, strength can be maximized along the length of the spring, while minimizing any rotational aspect of the spring along a horizontal axis 45.

Figure 4:
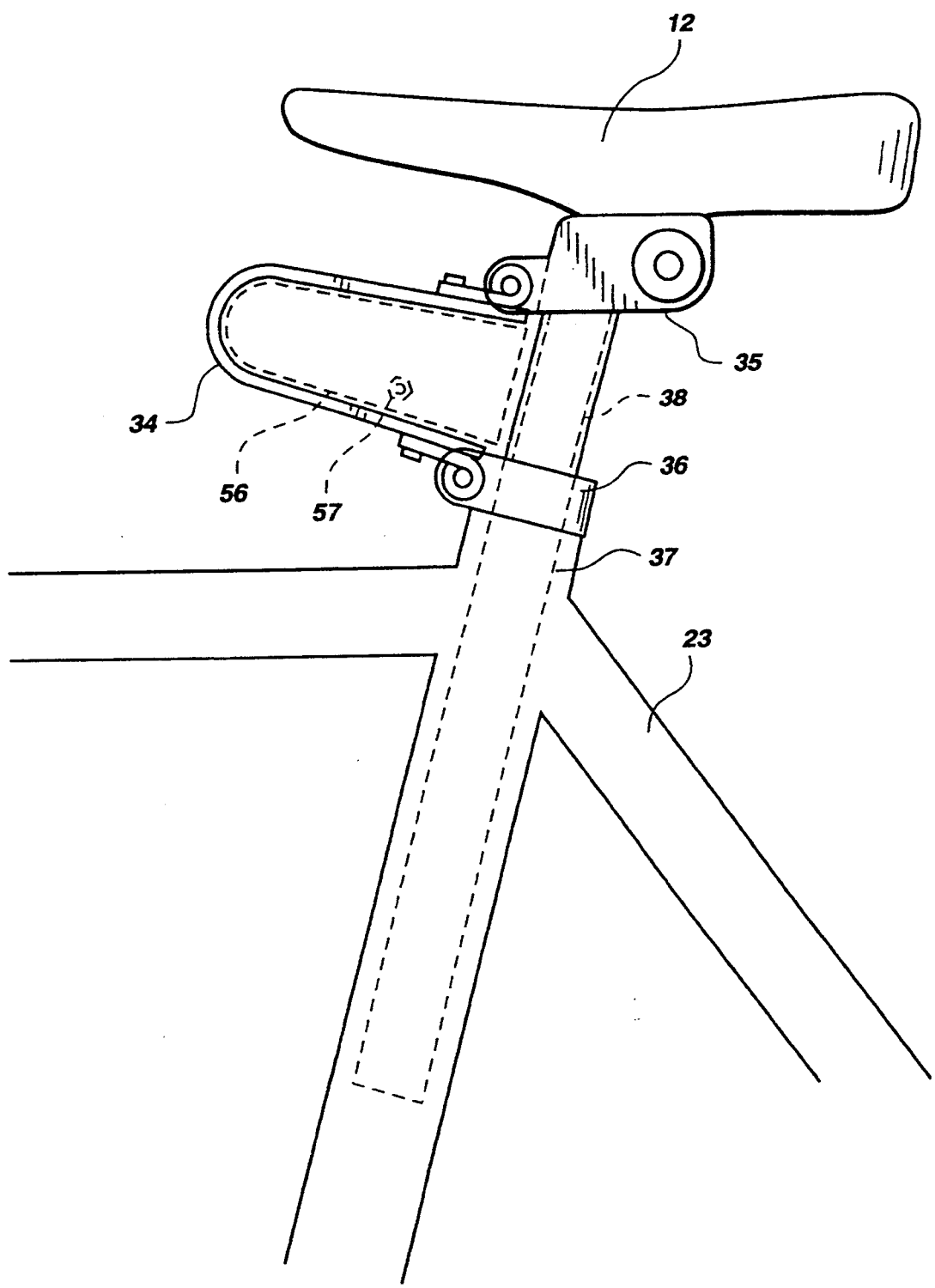
FIG. 4 illustrates another embodiment of the present invention.

Another possible design of the curved, composite spring uses this unique strength characteristic and is illustrated in FIG. 4. In this embodiment, the first end of the composite spring 34 is configured with attachment means 35 for attachment directly to the seat 12. The second end of the composite spring is configured with attachment means 36 for attachment onto a hollow shaft 37 which forms part of the bicycle frame 23. This configuration may include a stabilizing shaft 38 which is rigidly secured at one end to the attachment means 35 and slidably housed within the hollow shaft 37 which forms part of the frame 23. Otherwise, the seat 12 is supported solely by the composite spring 34, which has sufficient lateral stiffness to maintain lateral stability.

Figure 2:
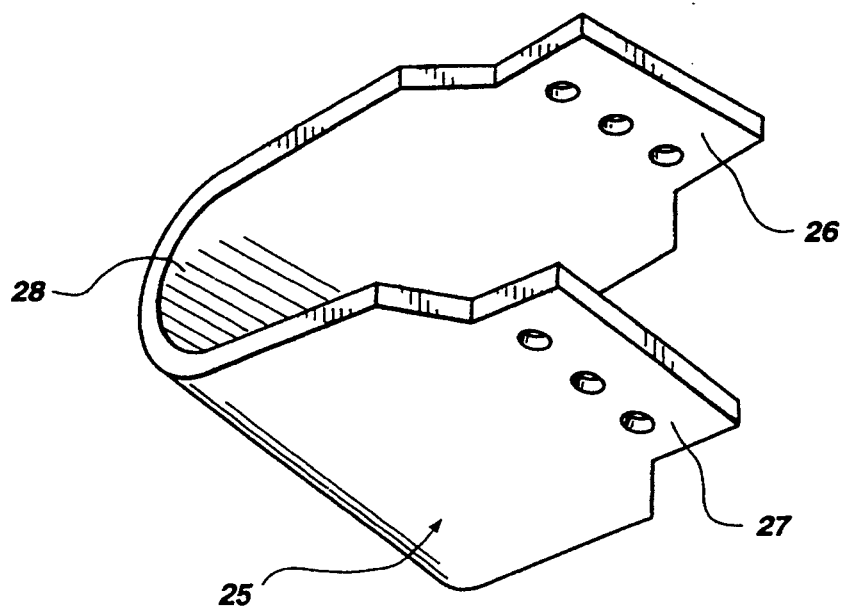
FIG. 2 shows a side view of a curved, composite spring.
Figure 3:
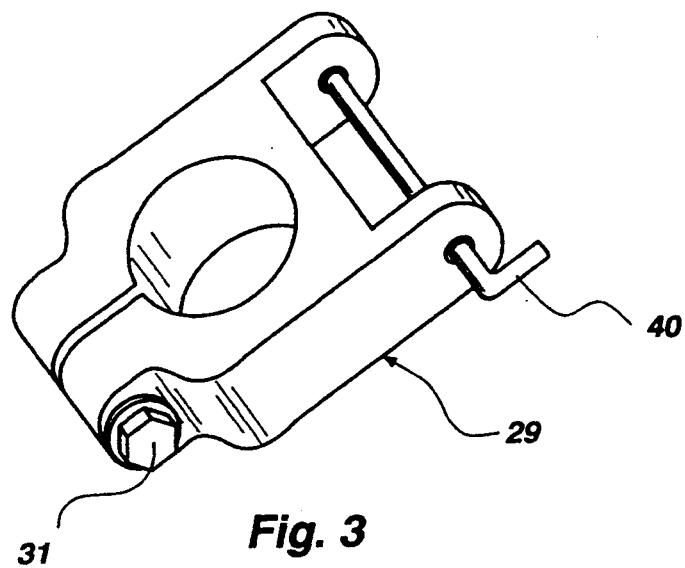
FIG. 3 shows an enlarged view of attachment means on ends of spring element.
Figure 5:
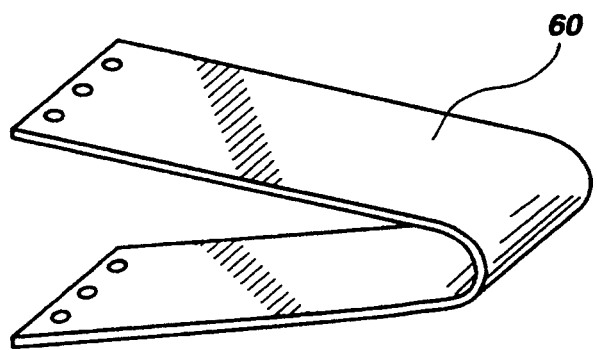
FIG. 5 is a side, perspective view of a V-shaped spring element.

FIG. 2 shows a curved, composite spring 25 with two ends 26, 27 and an intermediate section 28. The curved spring can be shaped in any nonlinear shape such as an arcuate form or a V-shaped spring 60 as shown in FIG. 5. Accordingly, the shape of the spring 25 can not be limited to either the arcuate or V-shape, but should allow leaf spring shapes in which the two ends are attached to the bicycle seat 12 and the hollow shaft 20.

Because the only existing support means on the bicycle seat device is the composite, curved spring 12, it is preferred that the spring 12 is strong enough to independently support the rider. Due to the inherent strength of composite material, the curved spring provides a strong enough resilient force on the bicycle seat 12 to support the rider. The fact that the curved spring is able to support the rider independently facilitates the need for only one spring being used on the bicycle seat device. This not only provides a consistent movement of the bicycle seat 12, but also enhances the rider's sense of control. Also, due to the simplicity of the design and the removable pins 34, the repair costs on such a singular spring biased bicycle seat would be cheaper in comparison with the prior art.

FIG. 1 shows the bicycle seat 12 coupled to a telescoping shaft 18 with a stopping member 55 fastened around the telescoping shaft. The stopping member 55 is made of a soft, rubber or sponge like material configured in the form of a donut. The telescoping shaft 18 is inserted within the opening of the stopping member 56. The telescoping shaft 18 is then inserted into the hollow shaft 20. The stopping member prevents contact between the bicycle seat 12 and the hollow shaft 20 during movement of the telescoping shaft within the hollow shaft. The stopping member 55 also provides a signal to the rider as to when the spring element 25 is losing it's resilience. It will be apparent that other forms of stopping members may be applied to cushion against contact between ends of the spring. For example, an inflatable air cushion 56 is shown in phantom line in FIG. 4. It includes a valve 57 for adding or releasing air pressure to adjust the resilience of the spring, based on rider preference.

It will be apparent to those skilled in the art that the present examples are given by way of illustration and are not to be considered as limiting, except as set forth in the following claims.

I claim:

1. A bicycle seat support comprising:
   a bicycle seat providing a seat surface to support a rider during use;
   a telescoping shaft for insertion within a larger, hollow shaft forming a part of a bicycle frame, said telescoping shaft being coupled to the bicycle seat;
   a nonlinear spring member composed of a composite material and including two ends and an intermediate section;
   attachment means coupled at each of the ends of the nonlinear spring member for enabling attachment of the nonlinear spring member between the bicycle seat and the larger, hollow shaft;
   said nonlinear spring member having nonisotropic strength orientation means for maximizing strength along the length of the spring while minimizing rotation of the spring along a horizontal axis of the spring.

2. A device as defined in claim 1, wherein the bicycle seat surface is directly coupled to the telescoping shaft, thereby preventing movement of the bicycle seat independent of the telescoping shaft.

3. A device as defined in claim 1, further comprising an intermediate hollow shaft configured for positioning within the larger, hollow shaft of the bicycle frame with minimum lateral tolerance that permits the telescoping shaft to slide within said intermediate hollow shaft, thereby inhibiting movement except along a shared axis of the telescoping shaft and said intermediate hollow shaft.

4. A device as defined in claim 1, wherein the telescoping shaft is inserted into the larger, hollow shaft associated with the bicycle frame, thereby allowing the seat surface movement along a shared axis with the telescoping shaft and the hollow shaft.

5. A device as defined in claim 1, wherein said nonlinear spring member comprises an arcuate shape.

6. A device as defined in claim 1, wherein said nonlinear spring member comprises a V-shape.

7. A device as defined in claim 1, wherein said nonlinear spring member is configured as a leaf spring free of convoluted configuration.

8. A device as defined in claim 1, wherein said nonlinear spring member is coupled between the telescoping shaft and the larger, hollow shaft of a bicycle frame.

9. A device as defined in claim 1, wherein said first end of nonlinear spring member is coupled directly to the bicycle seat and said second end of nonlinear spring member is coupled to the larger, hollow shaft of a bicycle frame.

10. A device as defined in claim 1, wherein said ends of the nonlinear spring collapse towards each other in response to application of a vertical force and provide resilience to return the ends to an original configuration which brings the telescoping shaft to rest after dissipation of the vertical force.

11. A device as defined in claim 1, wherein said telescoping shaft includes a resilient stopping member positioned between the ends of the nonlinear spring to absorb any impact between the ends of the nonlinear spring upon application of a vertical force.

12. A device as defined in claim 11, wherein said stopping member comprises an inflatable air cushion positioned between the two ends of the nonlinear spring and including a valve for adjusting inflation level of the air cushion.

13. A bicycle seat support comprising:
    a bicycle seat providing a seat surface to support a rider during use;
    a telescoping shaft for insertion within a larger, hollow shaft forming a part of a bicycle frame, said telescoping shaft being coupled to the bicycle seat;
    a nonlinear spring member composed of a composite material and including two ends and an intermediate section;
    attachment means coupled at each of the ends of the nonlinear spring member for enabling attachment of the nonlinear spring member between the bicycle seat and the larger, hollow shaft;
    wherein said telescoping shaft includes a resilient stopping member positioned between the ends of the nonlinear spring to absorb any impact between the ends of the nonlinear spring upon application of a vertical force;
    wherein said stopping member is positioned on the telescoping shaft and between the seat surface and the hollow shaft of a bicycle frame, thereby preventing contact between the bicycle seat and the hollow shaft during movement of the telescoping shaft.

14. A bicycle seat comprising:
    a bicycle seat providing a seat surface to support a rider during use;
    a telescoping shaft for insertion within a larger, hollow shaft, said telescoping being coupled to the bicycle seat;
    nonlinear spring member composed of a composite material and including two ends an intermediate section;
    attachment means at each end of the nonlinear spring member for enabling attachment of the first end of the spring member to the telescoping shaft and the second end of the spring member to the hollow, larger shaft;
    said nonlinear spring having nonisotropic strength orientation means for maximizing strength along the length of the spring while minimizing rotation of the spring along a horizontal axis of the spring.

15. A device as defined in claim 14, wherein the larger, hollow shaft is constructed to allow height adjustable attachment of said larger, hollow shaft to the frame of a bicycle to thereby enable height adjustment of the bicycle seat.

16. A device as defined in claim 15, further comprising a bicycle frame having a hollow frame shaft, wherein the telescoping shaft and attached larger, hollow shaft are securely coupled within the hollow frame of the bicycle frame.

17. A device as defined in claim 14, wherein the attachment means for attaching the first end of the spring member to the telescoping shaft includes a pivotable hinge which allows movement of the nonlinear spring independent of the telescoping shaft to thereby enable pivoting action of said first end of the spring member about a pivot axis of said pivotable hinge to thereby inhibit stress on said first end of the spring member.

18. A device as defined in claim 17, wherein the pivotable hinge includes a removable pin on which the hinge rotates, said removable pin allowing for easy replacement of the spring member.

19. A device as defined in claim 14, wherein the attachment means for attaching the second end of the spring member to the larger, hollow shaft includes a pivotable hinge which allows movement of the nonlinear spring independent of the larger, hollow shaft to thereby enable pivoting action of said second end of the spring member about a pivot axis of said pivotable hinge to thereby inhibit stress on said second end of the spring member.

20. A device as defined in claim 19, wherein the pivotable hinge includes a removable pin on which the hinge rotates, said pin allowing for easy replacement of the spring member.

21. A device as defined in claim 14, wherein said telescoping shaft includes a resilient stopping member positioned between the ends of the nonlinear spring to prevent abrupt contact between the ends of the nonlinear spring upon compression by outside forces.

22. A bicycle seat comprising:
a bicycle seat providing a seat surface to support a rider during use;
a telescoping shaft for insertion within a larger, hollow shaft, said telescoping shaft being coupled to the bicycle seat;
a nonlinear spring member composed of a composite material and including two ends and an intermediate section;
attachment means at each end of the nonlinear spring member for enabling attachment of the first end of the spring member to the telescoping shaft and the second end of the spring member to the hollow, larger shaft;
wherein said telescoping shaft includes a resilient stopping member positioned between the ends of the nonlinear spring to absorb any impact between the ends of the nonlinear spring upon application of a vertical force;
wherein said stopping member is positioned on the telescoping shaft and between the seat surface and the hollow shaft of a bicycle frame, thereby preventing contact between the bicycle seat and the hollow shaft during movement of the telescoping shaft.

* * * * *